June 28, 1932.  C. O. MARSHALL  1,865,326
WEIGHING SCALE
Filed July 29, 1929   2 Sheets-Sheet 1
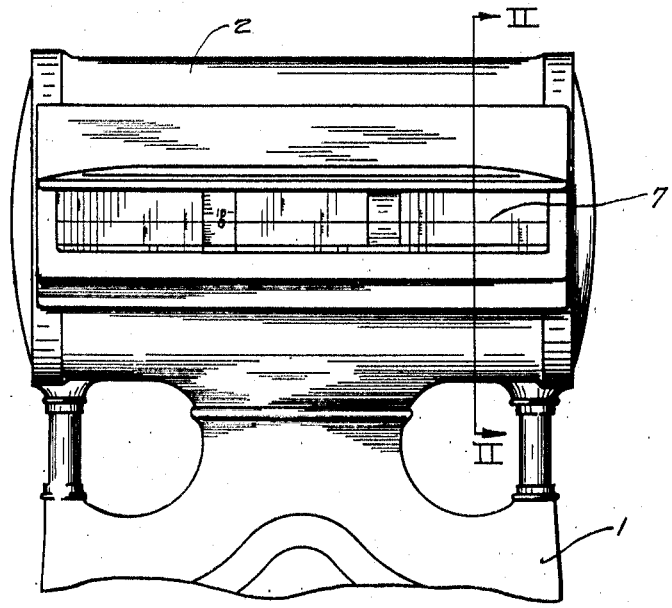
Fig. I
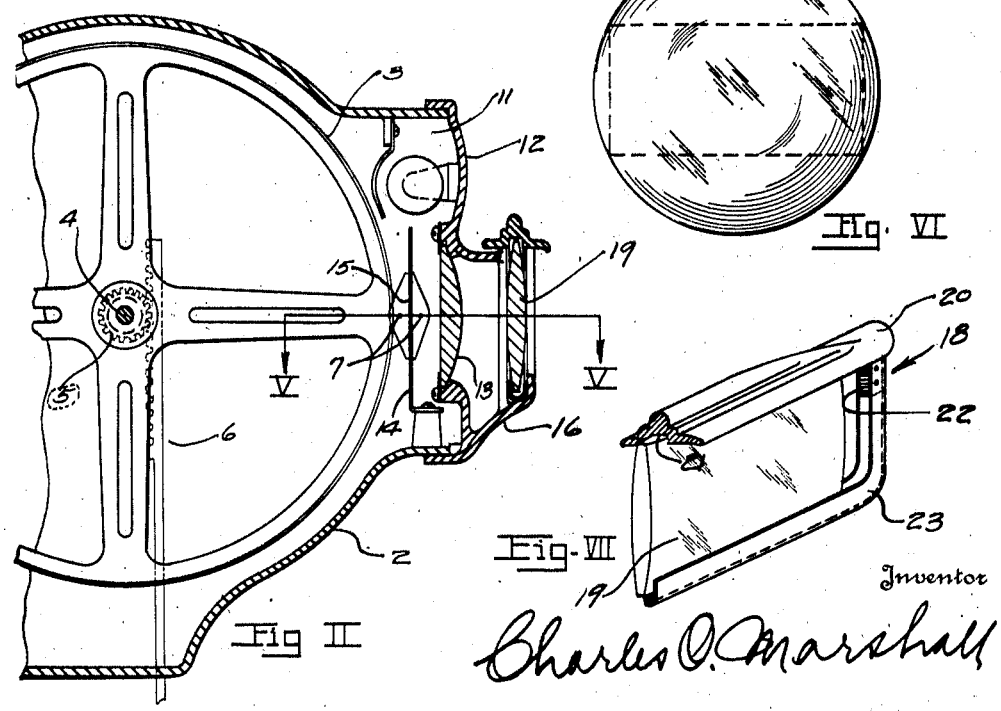
Fig. II   Fig. VII
Fig. VI
Inventor
Charles O. Marshall

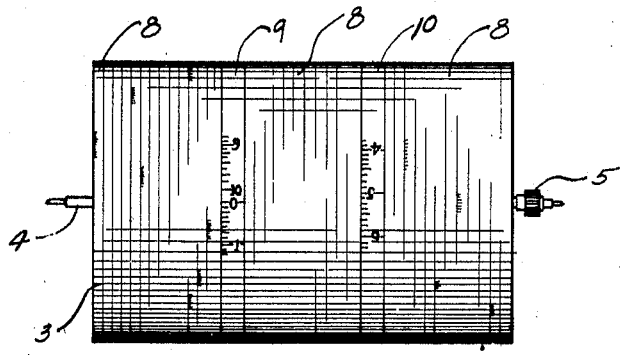
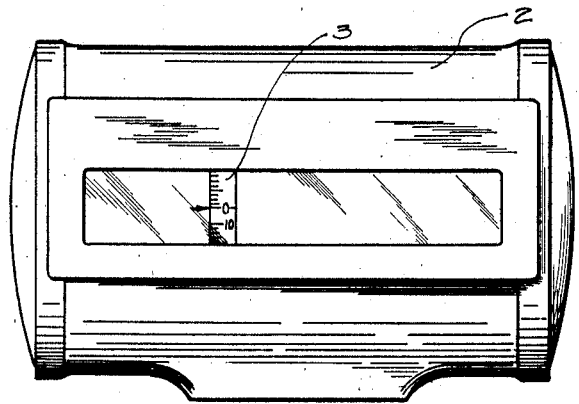
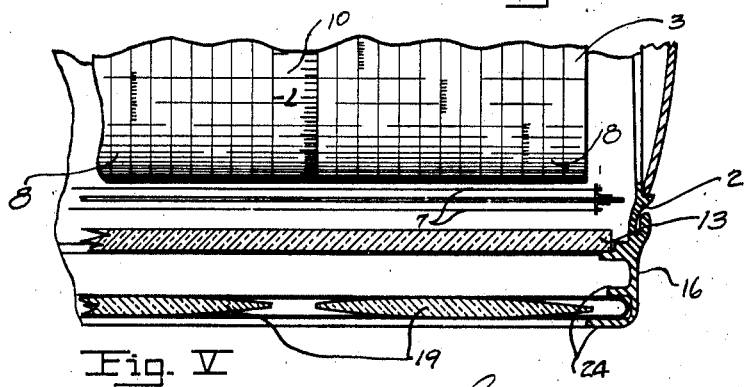

Patented June 28, 1932

1,865,326

UNITED STATES PATENT OFFICE

CHARLES O. MARSHALL, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed July 29, 1929. Serial No. 381,702.

This invention relates to weighing scales, and particularly to weighing scales used in retail shops.

One of the principal objects of the invention is the provision of means for magnifying the indications.

Another object of the invention is the provision of means for magnifying the computing values by means of spherical lenses.

Another object is the provision of means which enable a greater number of computed values to be provided.

A further object is the provision of means permitting an improved arrangement of the graduations and computations on a chart.

A still further object is the provision of improved means for retaining auxiliary lenses.

Other objects and advantages will be apparent from the following description, in which reference is had to the accompanying drawings illustrating a preferred embodiment of my invention and wherein similar reference numerals designate similar parts throughout the several views.

Referring to the accompanying drawings:

Figure I is a partial front elevation of a scale embodying the invention;

Figure II is an enlarged cross-section of the chart and magnifying arrangement taken substantially along the line II—II of Figure I;

Figure III is an elevational view of the chart;

Figure IV is a brack elevation of the chart housing showing the customer's indication;

Figure V is a fragmentary cross-sectional view taken substantially along the line V—V of Figure II;

Figure VI illustrates and shows that section of a spherical lens which is used in the auxiliary magnifying construction; and Figure VII is an enlarged fragmentary view showing the method of mounting the auxiliary magnifying lenses.

Referring to the drawings in detail, the scale per se to which I have shown the device embodying my invention attached is fully described in United States Patent No. 1,166,128 to Hapgood and I will describe it only so far as is necessary to properly describe my invention.

Secured to the housing 1, in which the counterbalancing mechanism (not shown) is suitably supported, is a chart housing 2. Resting on suitable anti-friction bearings (not shown) within this housing is a weight and value indicating chart 3. This chart consists of a shaft 4 to which is secured, adjacent one of its ends, a pinion 5 which meshes with a rack 6 the lower end of which is pivotally connected to a movable member of the scale, and a series of light metallic frames (not shown) about the circumference of which a cylinder of light material bearing weight and value indicia is stretched. When a load is placed on the commodity-receiver of the scale the movement caused thereby is transmitted by the lever and the rack to the chart. The teeth of the rack, meshing with the teeth of the pinion, translate this reciprocatory movement into rotation. As the movement of the lever is proportional to the weight of the load, the chart is revolved until the proper weight indicia registers with the reading and sighting lines 7 which are stretched immediately in front of the chart 3.

Scales of the type herein described have heretofore been equipped with a cylindrical lens for magnifying the indications. These lenses magnify only in one direction, which makes it necessary to use a figure on the chart which is rather wide and short in height so as not to distort the image too much. This greatly limits the number of computed value columns 8 which may be placed on the chart. It would be impractical and too expensive to use a single section of a spherical lens to magnify these indications, as charts of this type are generally thirteen to fourteen inches long. I have provided means and a practical arrangement of the weight and value indicia columns on the chart 3 which permit the use of three separate sections of spherical lenses to additionally magnify the value computations. These sections are cut from lenses which are of such size as to be readily obtainable on the market at a reasonable price. The chart 3, Figure III, is divided into three substantially equal zones of value computations 8 by the merchant's weight indication column 9 and the customer's weight indication column 10. This additional magnification by spherical lenses permits a smaller figure to be used, resulting in more value computing columns.

The housing 2 is provided with an opening 11 which is covered in front by a frame 12 in which the usual cylindrical lens 13 is fastened. Located directly back of this lens and secured to the chart casing 2 is a price indicating frame 14. This frame also has an opening 15, through which a portion of the weight and value indicia are visible. Along the bottom of this opening is printed a series of unit values which correspond to the computed values shown on the columns 8. It has been found that the lens 13 sufficiently magnifies these figures in most cases. However, it is sometimes necessary to further magnify the weight and value indicia for near-sighted merchants. To do this in such manner that the regular scale can be changed I have provided the frame 12 with an extension 16 which is adapted to receive a lens holder 18 which efficiently spaces and retains the sections of the spherical lens 19. It will be readily seen that this frame 12 may be interchangeable with a similar frame in which only the cylindrical lens 13 is mounted, thus making it possible for a merchant, as his eyesight weakens, to purchase only this extra frame instead of an entire scale.

The lens holder 18 consists of a metallic cast head 20 in the under side of which is a groove 21. Depending from the ends are two rectangular shaped bosses 22 to which is fastened a substantially U-shaped frame 23 of formed sheet metal. It will be seen that the lenses 19 may be properly secured in the frame formed by the groove 21 and the U-shaped member 23.

The extension 16 of the frame 12 is provided with laterally extending ribs 24 which form a groove for the reception of the auxiliary lens frame 18. This frame is thus mounted in a manner which permits its removal for cleaning.

The embodiment of my invention herein shown and described is to be regarded as illustrative only and it is to be understood that the invention is susceptible to variation, modification and change within the spirit and scope of the subjoined claims.

Having described my invention, I claim:—

1. In a weighing scale, in combination, a relatively movable chart and index, said chart having a plurality of value computing columns and a plurality of weight indicating columns, said weight indicating columns dividing said value computing columns into three substantially equal zones, and a plurality of spherical lenses mounted directly in front of the computing value zones, the width of said lenses being substantially equal to the width of the computed value zones.

2. In a weighing scale, in combination, a relatively movable chart and index, said chart having weight indication columns and value computing columns, said weight indicating columns dividing said value computing columns into three substantially equal zones, a cylindrical lens mounted to magnify the weight indicating columns and the value computing columns, and a plurality of spherical lenses mounted in front of said cylindrical lens for magnifying the magnified image of the value computing columns.

CHARLES O. MARSHALL.